United States Patent
Donderici

(10) Patent No.: US 12,420,833 B2
(45) Date of Patent: Sep. 23, 2025

(54) OPTIMIZATION AND SELECTION OF COMPUTE PATHS FOR AN AUTONOMOUS VEHICLE

(71) Applicant: GM Cruise Holdings LLC, San Francisco, CA (US)

(72) Inventor: Burkay Donderici, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 199 days.

(21) Appl. No.: 17/946,790

(22) Filed: Sep. 16, 2022

(65) Prior Publication Data

US 2024/0092386 A1    Mar. 21, 2024

(51) Int. Cl.
*B60W 60/00* (2020.01)
*B60W 50/00* (2006.01)
*B60W 50/06* (2006.01)

(52) U.S. Cl.
CPC .... *B60W 60/0013* (2020.02); *B60W 50/0098* (2013.01); *B60W 50/06* (2013.01); *B60W 60/0015* (2020.02); *B60W 2050/0005* (2013.01); *B60W 2050/065* (2013.01)

(58) Field of Classification Search
CPC ......... B60W 60/0013; B60W 50/0098; B60W 50/06; B60W 60/0015; B60W 2050/0005; B60W 2050/065; B60W 60/0011; B60W 60/0016
See application file for complete search history.

(56) References Cited

U.S. PATENT DOCUMENTS

| | | | |
|---|---|---|---|
| 2021/0190508 A1* | 6/2021 | Alsharif | G06F 9/4843 |
| 2022/0118991 A1* | 4/2022 | Chen | B60W 50/038 |
| 2023/0112004 A1* | 4/2023 | Hari | G06F 11/3457 |
| | | | 701/23 |

* cited by examiner

*Primary Examiner* — Aniss Chad
*Assistant Examiner* — Nikki Marie M Molina
(74) *Attorney, Agent, or Firm* — Honigman LLP; Matthew H. Szalach; Jonathan P. O'Brien

(57) ABSTRACT

Systems and techniques are provided for optimizing autonomous vehicle compute paths and identifying latency violations. An example method can include identifying at least one compute path for processing input sensor data by an autonomous vehicle, wherein the at least one compute path includes a set of nodes that are interconnected by one or more edges; implementing a first test iteration of at least one simulation scenario for testing the at least one compute path, wherein the first test iteration of the at least one simulation scenario applies a first artificial delay to at least one edge from the one or more edges; and calculating at least one of a safety parameter and a comfort parameter, wherein the safety parameter and the comfort parameter are based on a result of the at least one simulation scenario.

17 Claims, 8 Drawing Sheets

OPTIMIZATION AND SELECTION OF COMPUTE PATHS FOR AN AUTONOMOUS VEHICLE

BACKGROUND

1. Technical Field

The present disclosure generally relates to autonomous vehicles and, more specifically, to optimizing and selecting compute paths for an autonomous vehicle.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
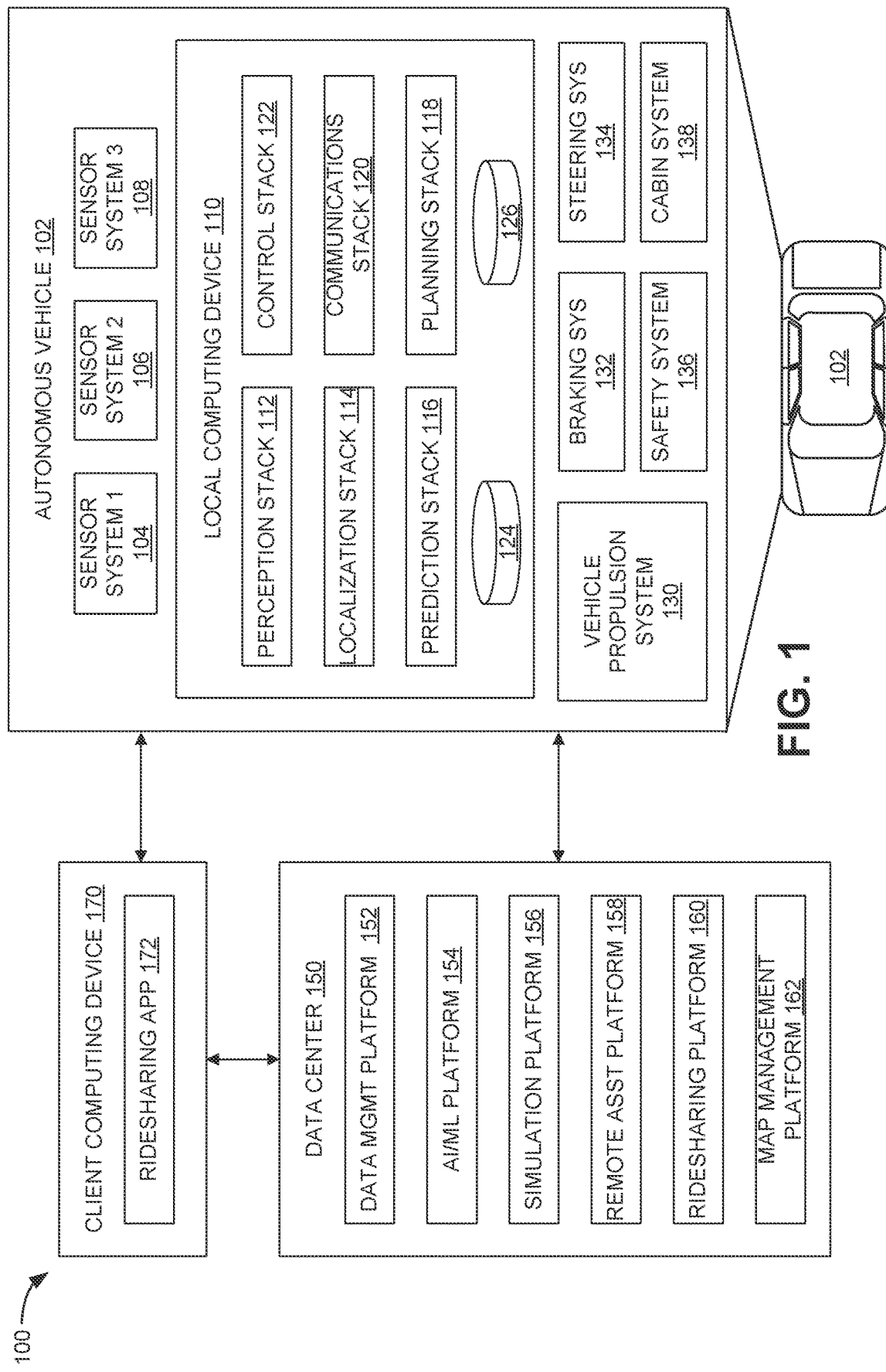
FIG. 1 is a diagram illustrating an example system environment that can be used to facilitate autonomous vehicle (AV) navigation and routing operations, in accordance with some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. For example, AVs can include sensors such as a camera sensor, a LIDAR sensor, and/or a RADAR sensor, amongst others, which the AVs can use to collect data and measurements that are used for various AV operations. The sensors can provide the data and measurements to an internal computing system of the autonomous vehicle, which can use the data and measurements to control mechanical systems of the autonomous vehicle, such as a vehicle propulsion system, a braking system, and/or a steering system, etc.

In some cases, the time it takes for an AV to perform compute tasks (e.g., processing sensor input data) can be stochastic. The non-deterministic processing time by the AV may be due to conditions such as hardware variations, scene complexity (e.g., number of objects, cars, pedestrians, etc.), processor loading, timing variations, data flow variations, compute paths used, etc. In some instances, the AV may perform a safe stop (e.g., discontinue ride service and pull over to side of the road) if the AV determines that the processing time exceeds a safety threshold (e.g., a latency threshold). For instance, the AV may determine that the sensor data is stale, and therefore the AV is not able to react to the environment in a timely manner that ensures safe operation. The safety threshold that an AV relies upon for initiating a safe stop is set heuristically.

Systems and techniques are provided herein for optimizing and selecting compute paths for an AV. In some examples, a simulation environment can be used to test one or more AV compute paths using different test scenarios. In some cases, artificial delays can be introduced at one or more of the edges in the compute path in order to determine a maximum tolerable execution delay that satisfies safety parameters and/or passenger comfort parameters for each corresponding scene or environment. In some instances, one or more compute paths can be tested simultaneously (e.g., compute paths can be enabled or disabled for each test). In some aspects, the testing can be used to identify an optimal compute path for each corresponding scene or environment. In some aspects, the testing and/or simulation data can be used by an AV that is in operation to dynamically determine the threshold for initiating a safe stop based on the AV environment. In some cases, the testing and/or simulation data can also be used by an AV to configure a compute path based on the AV environment to facilitate faster processing of sensor data, if necessary.

FIG. 1 is a diagram illustrating an example autonomous vehicle (AV) environment 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170.

These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some aspects, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

As noted above, the time it takes for an AV to process sensor input data may vary based on many different factors. For instance, the complexity of the environment surrounding the AV (e.g., scene complexity) can cause variations in compute time because of the amount of sensor data that is collected, and the processing time required to identify objects in the scene, predict behavior of the objects, etc. In some cases, an AV may initiate a safe stop if the AV determines that the latency in processing input data exceeds a safety threshold and/or a passenger comfort threshold.

Figure 2:
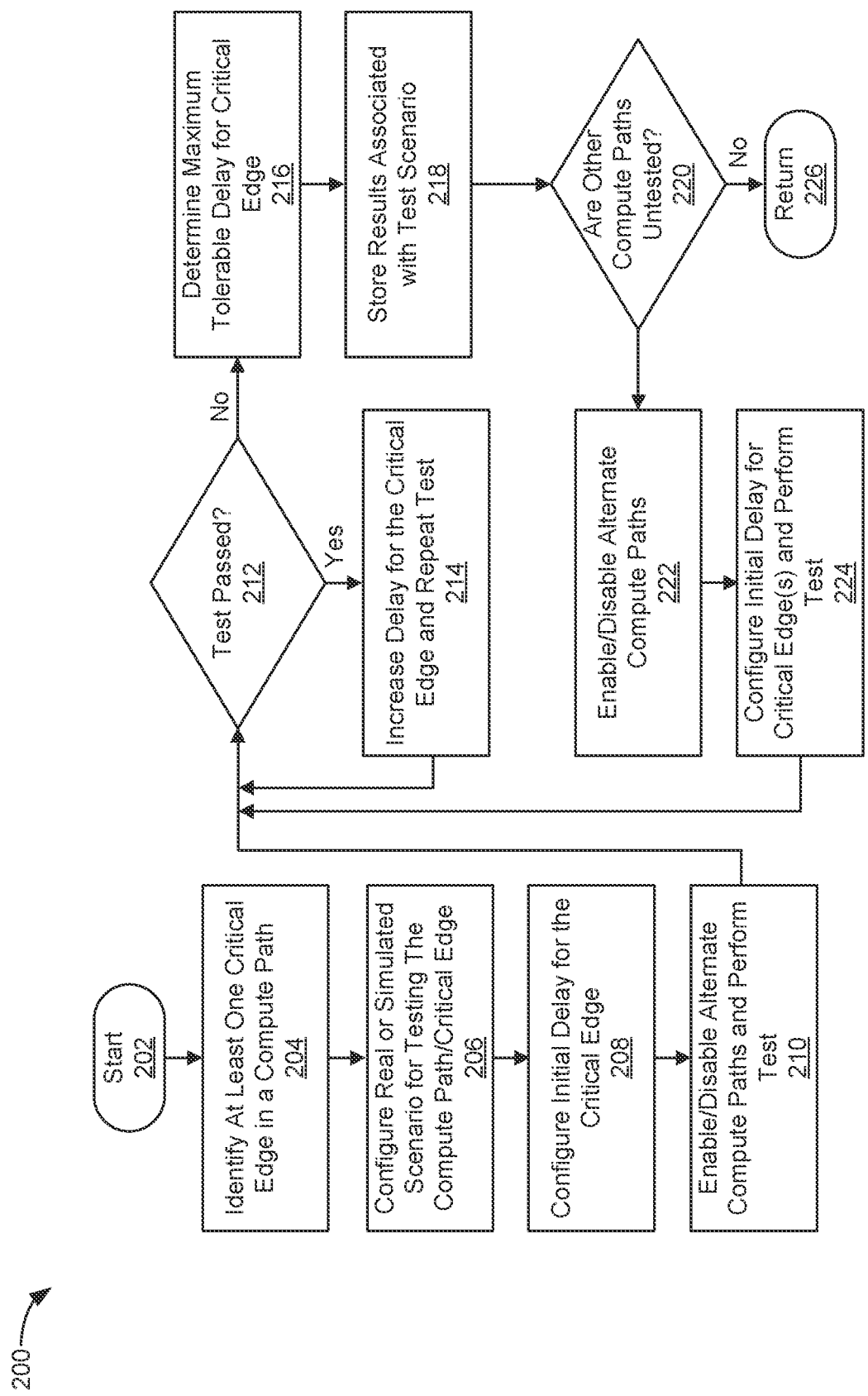
FIG. 2 is a flowchart diagram illustrating an example process for testing and optimizing compute paths in an autonomous vehicle, in accordance with some examples of the present disclosure.

FIG. 2 is a flowchart diagram illustrating an example process 200 for testing and optimizing compute paths in an autonomous vehicle (AV). In some aspects, process 200 may start at step 202, which may include initializing of hardware or software systems associated with an AV (e.g., AV 102) and/or with an AV simulation environment (e.g., simulation platform 156). In some examples, process 200 may include step 204 in which at least one critical edge (e.g., an edge refers to a link among nodes or vertices in the network) is identified in an AV compute path. In some aspects, a critical edge in a compute path may correspond to an edge that introduces or causes a delay in the compute time. In some examples, delays in one or more edges may cause the compute time to exceed a safety threshold and/or a passenger comfort threshold that may cause the AV to initiate a safe stop.

Figure 3A:
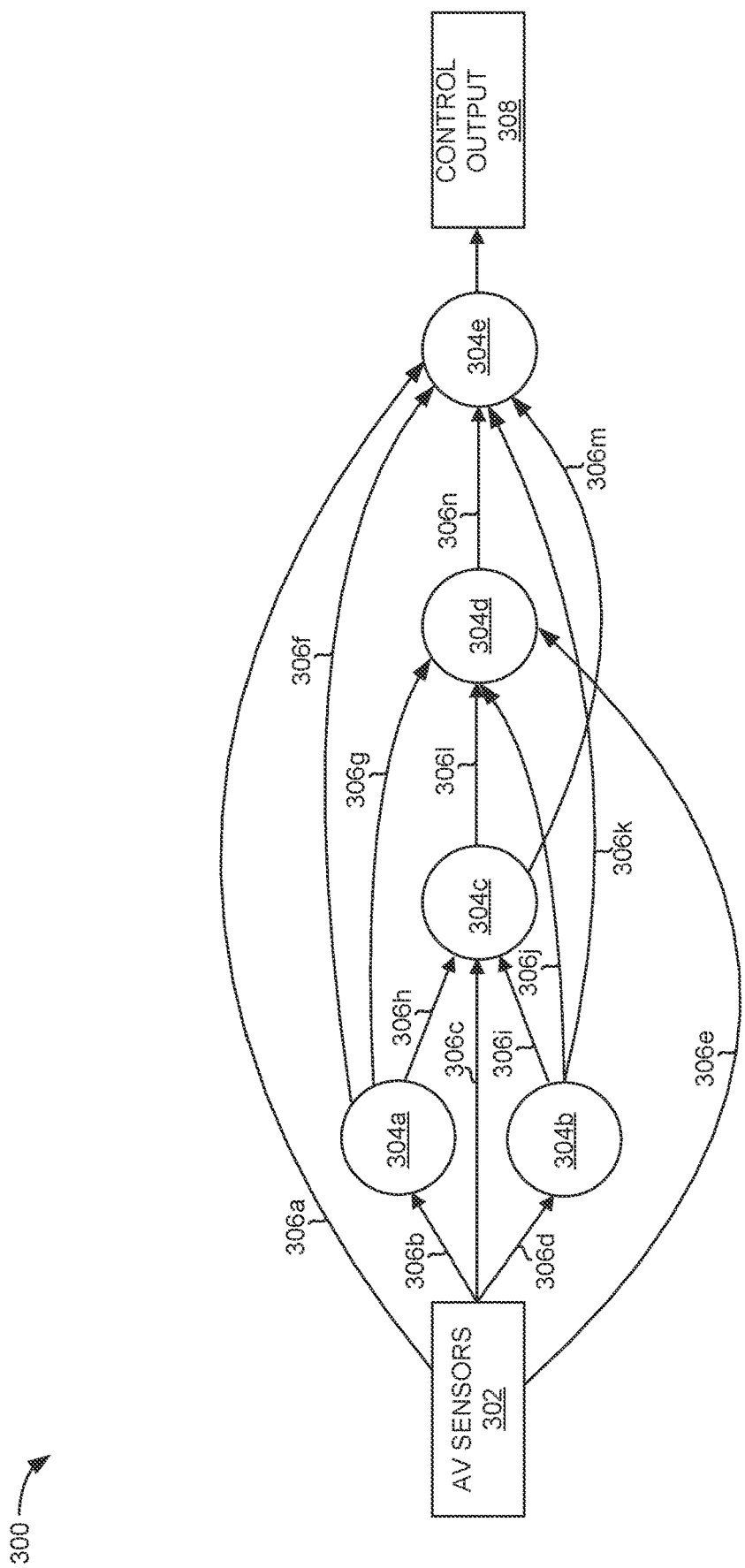
FIG. 3A is a network diagram illustrating an example of compute paths that may be implemented by an autonomous vehicle, in accordance with some examples of the present disclosure.

FIG. 3A is a diagram of network 300 that illustrates examples of compute paths that may be implemented by an AV (e.g., AV 102). In some cases, network 300 may include one or more nodes (e.g., node 304 a, node 304 b, node 304 c, node 304 d, and node 304 e, collectively referred to as "nodes 304") that can be part of different AV compute paths. In some aspects, the AV compute paths can include one or more edges (e.g., links) that connect nodes 304. As illustrated, network 300 includes edge 306 a, edge 306 b, edge 306 c, edge 306 d, edge 306 e, edge 306 f, edge 306 g, edge 306 h, edge 306 i, edge 306 j, edge 306 k, edge 306 l, edge 306 m, and edge 306 n (collectively referred to as "edges 306").

In some examples, nodes 304 can correspond to one or more components of an AV stack. In one illustrative example, node 304a may correspond to perception stack 112; node 304b may correspond to localization stack 114; node 304c may correspond to prediction stack 116; node 304d may correspond to planning stack 118; and node 304e may correspond to control stack 122. Those skilled in the art will recognize that network 300 may include any number of nodes 304 corresponding to additional and/or different stacks, algorithms, components, etc. of an AV.

In some aspects, network 300 includes multiple compute paths that include one or more of nodes 304. In some cases, the compute paths can be used to process sensor data received from AV sensors 302 (e.g., sensor systems 104-108). For instance, sensor data from AV sensors 302 can be processed by nodes 304 to determine control output 308. In some instances, control output 308 can include one or more commands or settings for operating the AV (e.g., control output 308 can correspond to settings or commands provided to vehicle propulsion system 130, braking system 132, steering system 134, safety system 136, cabin system 138, etc.).

In some examples, a compute path can include all nodes 304. In some cases, a compute path can correspond to a reflexive path (e.g., a path that shortcuts one or more components) and includes a subset of nodes 304. For instance, a reflexive path may bypass nodes corresponding to the prediction stack 116 and/or the planning stack 118 to yield a faster processing time. In one illustrative example, a reflexive path may be used if the AV sensors 302 detect an object or pedestrian that is in close proximity to the AV, and the AV needs to stop to avoid a collision.

In some cases, a compute path that includes all nodes 304 may use the following edges: edge 306b and edge 306d (e.g., input data from AV sensors 302 to node 304a and node 304b, respectively); edge 306h (e.g., data from node 304a to node 304c); edge 306i (e.g., data from node 304b to node 304c); edge 306l (data from node 304c to node 304d); and edge 306n (data from node 304d to node 304e). In another example, a reflexive compute path that includes a subset of nodes 304 may use edge 306e (e.g., input data from AV sensors 302 to node 304d) and edge 306n (e.g., data from node 304d to node 304e).

Returning to FIG. 2, at step 206, the process 200 can include configuring real and/or simulated test scenarios for testing a compute path and/or a critical edge within a compute path. In some aspects, the test scenarios can be configured to exercise or stress different hardware and/or software components of the AV. In some cases, test scenarios can be configured to test the manner in which an AV responds to any scene that may occur in a real-world driving environment (e.g., the test scenario can include pedestrians, pets, cyclists, cars, trucks, traffic signals, traffic signage, weather conditions, detours, road construction, accidents, emergency vehicles, etc.). For instance, one illustrative test scenario may include dozens of pedestrians walking through and around a four-way intersection having a broken traffic signal, while vehicles attempt to cross the intersection in all directions and workers are present repairing the traffic signal during a heavy rainstorm.

At step 208, the process 200 can include configuring an initial delay for the critical edge in the compute path. In some aspects, a delay can be configured for one or more edges 306 within network 300 in order to model a processing delay by one or more nodes 304. For example, a delay can be introduced at edge 306h that would delay the output data from node 304a from reaching node 304c. In some cases, the initial delay may be set to a value of zero. For example, a first simulated test scenario can be conducted for determining the inherent delay between each of nodes 304.

In some examples, the delay can be introduced by configuring an artificial (e.g., fake or unproductive) workload such as a software loop or function that repeats a computation a certain number of times (e.g., to achieve a desired delay). For instance, in one illustrative example, the timing of the delay can be controlled by increasing or decreasing the number of iterations in a loop. In some cases, the delay can be configured by slowing down processing by the nodes 304 by increasing a workload (e.g., repeating a computation), restricting compute resource usage (e.g., reducing memory allocation or reducing number of central processing unit (CPU) cores), and/or using any other configuration that causes a processing delay. In some aspects, the delay time can be measured, configured, and/or modified based on a measurement of time using a system clock.

At step 210, the process 200 can include enabling and/or disabling alternate compute paths and performing the test. In some cases, a test scenario may be configured to exercise a single compute path and other compute paths may be disabled. In some instances, a test scenario may be configured to exercise a subset of all available compute paths with remaining compute paths being disabled. For instance, a test scenario may enable two different compute paths and monitor for use of each based on a test scenario variable (e.g., distance between AV and pedestrian). In some aspects, a test scenario may be configured to enable all possible compute paths in order to determine selection of compute path by the AV based on the test scenario and/or latency exhibited by each of the compute paths.

Figure 3B:
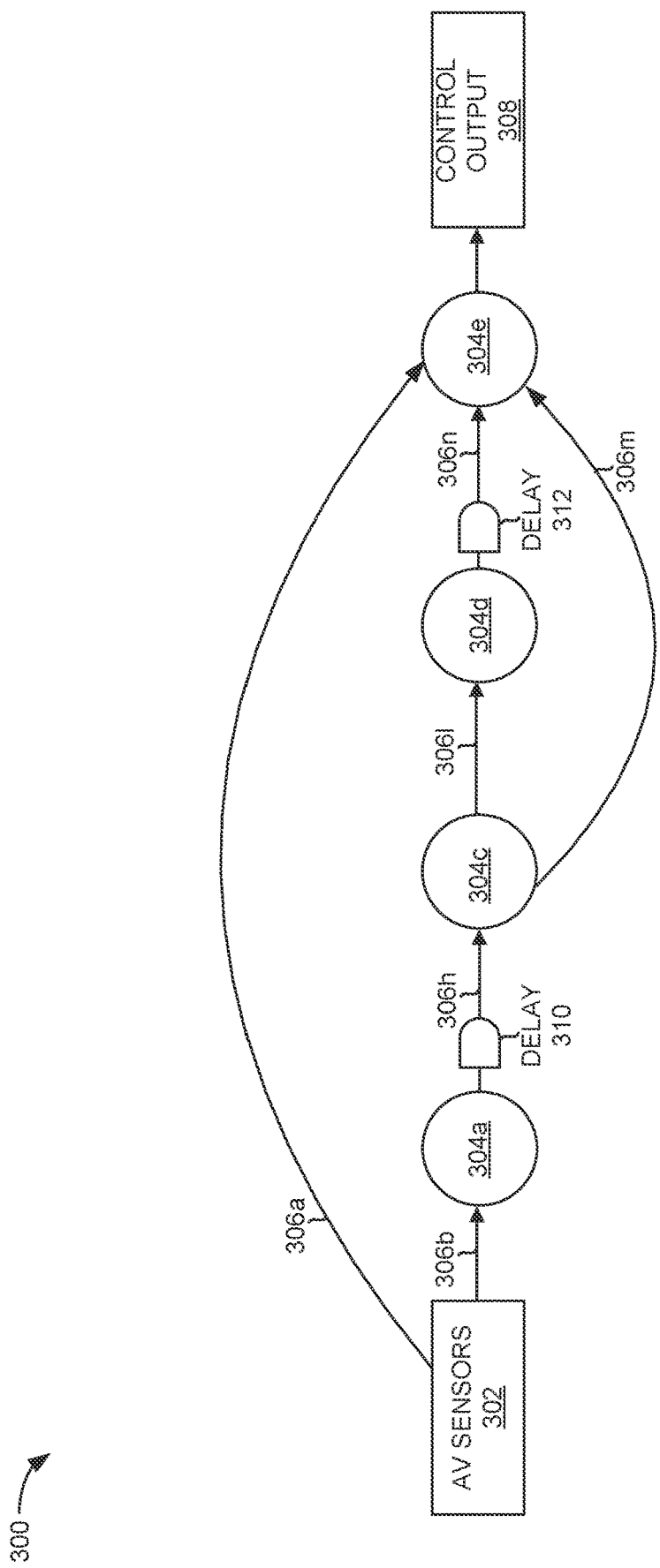
FIG. 3B is a network diagram illustrating another example of compute paths that may be implemented by an autonomous vehicle, in accordance with some examples of the present disclosure.

FIG. 3B is a diagram of network 300 that illustrates an example configuration for a test scenario as may be configured by process 200. In some aspects, one or more delays can be introduced at different ones of edges 306. As illustrated, delay 310 is configured at edge 306h (e.g., data from node 304a to node 304c is delayed), and delay 312 is configured at edge 306n (e.g., data from node 304d to node 304e is delayed).

In some aspects, the configuration for testing network 300 may include (e.g., enable) three different compute paths. For example, a first compute path can include edge 306b (e.g., input data from AV sensors 302 to node 304a); edge 306h (e.g., data from node 304a to node 304c); edge 306l (data from node 304c to node 304d); and edge 306n (data from node 304d to node 304e). In some cases, a second compute path may skip node 304d and include the following: edge 306b (e.g., input data from AV sensors 302 to node 304a); edge 306h (e.g., data from node 304a to node 304c); and edge 306m (e.g., data from node 304c to node 304e). In some instances, a third compute path may skip node 304a, node 304c, and node 304d, and may include edge 306a (e.g., input data from AV sensors 302 to node 304e). In some examples, remaining compute paths of network 300 may be disabled. For example, compute paths that utilize node 304b may be disabled.

Returning to FIG. 2, at step 212 the process 200 can make a determination as to whether the test passed. In some cases, the pass/fail criteria for a test scenario can be based on parameters related to one or more parameters associated with the AV behavior. In some examples, the pass/fail criteria can be based on a safety parameter. For example, a safety parameter may correspond to a threshold distance that the AV should maintain from pedestrians. In some cases, a test may fail if the AV violates the threshold distance by getting too close to a pedestrian. In some aspects, the pass/fail criteria can be based on a passenger comfort parameter. For example, a passenger comfort parameter may correspond to a braking time or to a corresponding force caused by braking. In some cases, the test may fail if the AV violates the passenger comfort parameter by braking in a manner that exceeds a tolerable force for the passenger.

In some examples, if it is determined that a test passed at step 212, the process 200 may proceed to step 214 and increase the delay for the critical edge and repeat the test. For example, delay 310 and/or delay 312 may be increased by 0.5 milliseconds (ms) and the test scenario can be repeated.

In some cases, if it is determined that a test fails at step 212, the process 200 may proceed to step 216. At step 216, a maximum tolerable delay for the critical edge can be determined. In some aspects, the maximum tolerable delay may be based on the delay that caused the failure condition that was detected at step 212. For example, the maximum tolerable delay may correspond to a percentage of delay 310 and/or delay 312 that caused the failure. In one illustrative example, if delay 310 was set to a value of 500 ms during the failed test run, the maximum tolerable delay can be set to 400 ms (e.g., provide a 20% margin from the failure condition).

At step 218, the process 200 can include storing the results associated with the test scenario. In some examples, the maximum tolerable delay that was determined at step 216 can be stored and associated with the conditions pertaining to the test scenario (e.g., pedestrians, vehicles, weather, and/or any other parameter/variable associated with the scene in the test scenario). In some cases, an AV may use the maximum tolerable delay associated with a test scenario to determine when to initiate a safe stop in a real-world driving scenario.

In some aspects, the one or more compute paths that were tested may also be stored in association with the conditions pertaining to the test scenario. In some cases, an AV may use this information to select one or more compute paths based on real-world conditions. In some examples, the results/data from the test scenario (e.g., maximum tolerable delay, safety parameters, comfort parameters, compute paths, test scene parameters, etc.) can be stored in a database. In some aspects, the results/data from the test scenario can be used to train a machine learning model that can be used by an AV to configure safe stop conditions and compute paths based on the AV environment.

At step 220, the process 200 can determine whether additional compute paths or combinations of compute paths were not tested. In some aspects, if all compute paths and combinations thereof have been tested, the process 200 can proceed to step 226 in which the process returns to prior processing, which may include repeating the process 200 (e.g., using a different test scenario).

In some examples, if additional compute paths or compute path combinations remain untested, the process can proceed to step 222. At step 222, further combinations of compute paths can be enabled or disabled. For instance, with reference to FIG. 3B, further tests or simulations can be run that excludes the third compute path (e.g., edge 306a between AV sensors 302 to node 304e). In another example, additional compute paths from network 300 (e.g., as illustrated in FIG. 2A) may be enabled and tested.

At step 224, the process 200 can configure an initial delay for one or more critical edges and perform the test scenario. As noted above, the initial delay may correspond to zero in order to find a baseline delay that may be inherent in the compute paths based on the test scenario. After step 224, the process 200 may proceed to step 212 to determine whether the test passed, and the process 200 may repeat steps 212, 214, 216, 218, and 220 until all compute paths and/or combinations of compute paths have been tested in connection with the test scenario.

Figure 4:
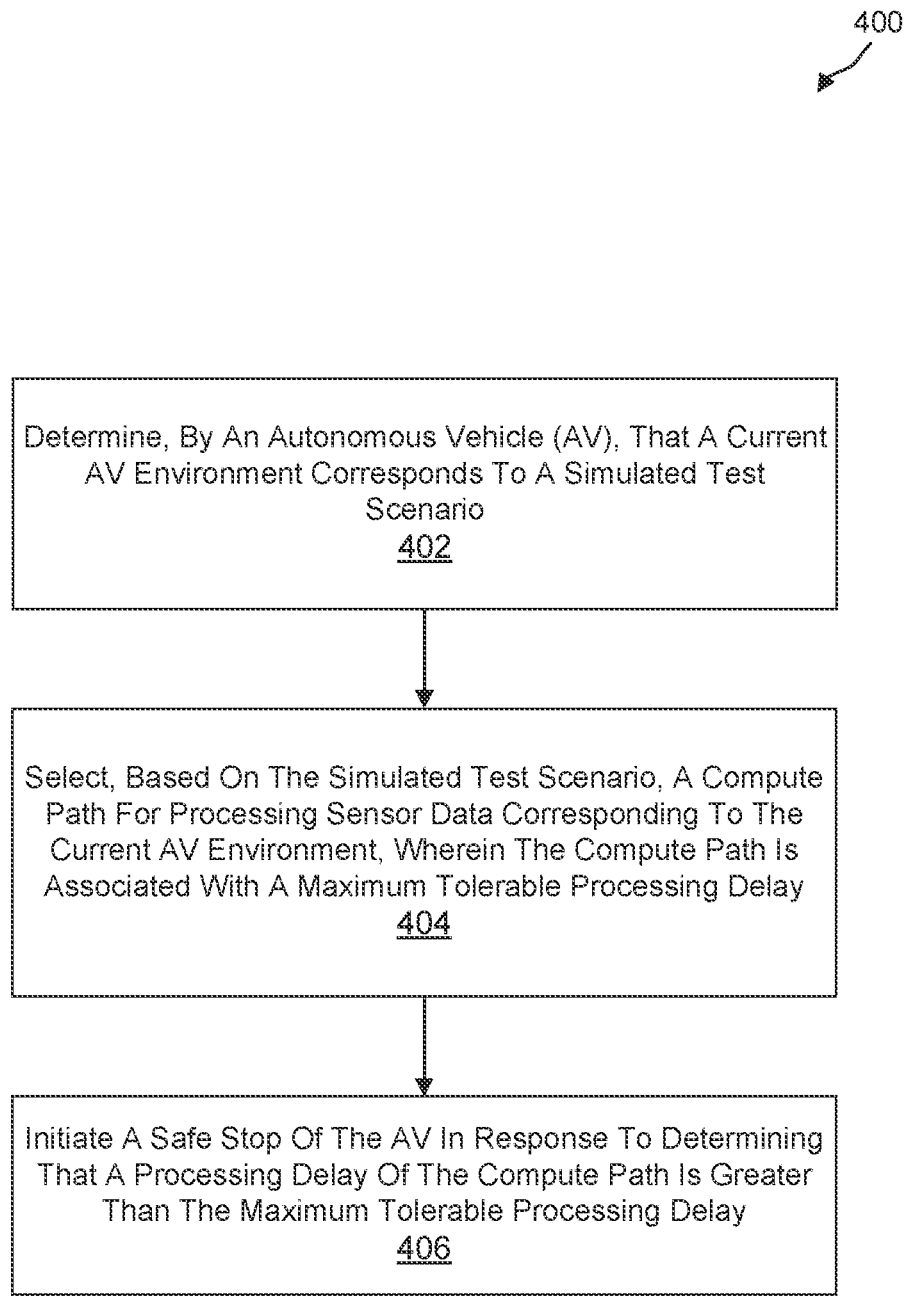
FIG. 4 is a flowchart diagram illustrating an example process for selecting a compute path and configuring safe stop conditions in an autonomous vehicle, in accordance with some examples of the present disclosure.

FIG. 4 illustrates an example of a process 400 for selecting a compute path and implementing a safe stop by an AV. At step 402, the process 400 includes determining, by an AV, that a current AV environment corresponds to a simulated test scenario. In some aspects, an AV may determine correspondence between the current AV environment and the simulated test scenario based on one or more variable or parameters that are common among both (e.g., pedestrian(s), object(s), vehicle(s), weather, type of road, number of lanes, traffic conditions, road signage, speed limit, etc.). In some cases, the AV may include a machine learning model that may use input data (e.g., AV sensor data) to identify one or more corresponding simulated test scenarios.

At step 404, the process 400 includes selecting, based on the simulated test scenario, a compute path for processing sensor data corresponding to the current AV environment, wherein the compute path is associated with a maximum tolerable processing delay. For example, the AV may select a compute path that includes all or a portion of nodes 304.

In some cases, the maximum tolerable delay can be based on a delay that was introduced during simulation testing of a test scenario that corresponds to the current AV environment (e.g., delay 310 and/or delay 312).

At step 406, the process 400 includes initiating a safe stop of the AV in response to determining that a processing delay of the compute path is greater than the maximum tolerable processing delay. For example, the AV may determine that data received by node 304e is stale or old based on a processing delay of the compute path. In some aspects, based on the simulation data in the AV databased and/or on the machine learning model, the AV may determine that such stale data is likely to result in an unsafe condition and/or violate a passenger comfort threshold. In response, the AV may initiate a safe stop condition to avoid violating a safety threshold and/or a passenger comfort threshold.

Figure 5:
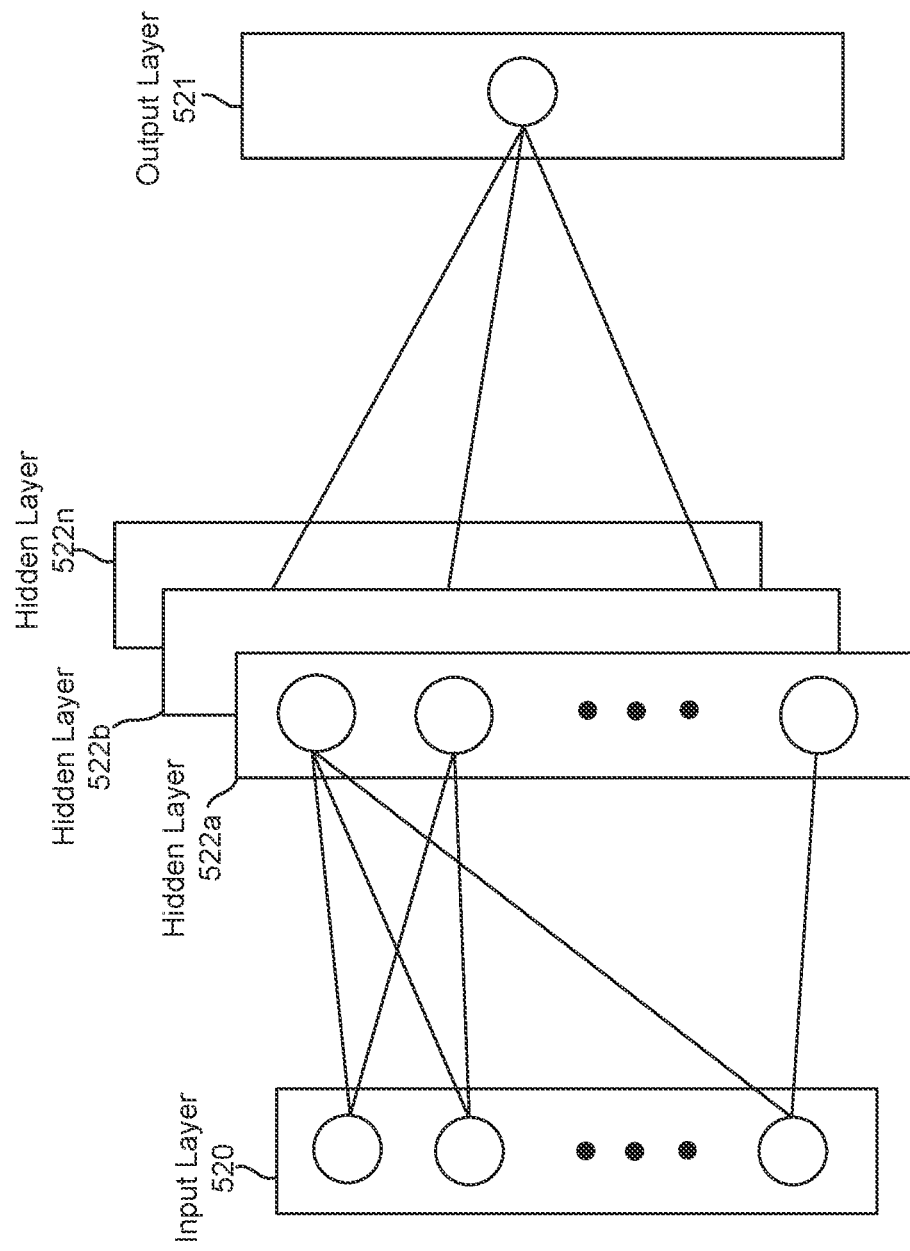
FIG. 5 illustrates an example of a deep learning neural network that can be used to implement aspects of compute path optimization in an autonomous vehicle, in accordance with some examples of the present disclosure.

In FIG. 5, the disclosure now turns to a further discussion of models that can be used through the environments and techniques described herein. FIG. 5 is an example of a deep learning neural network 500 that can be used to implement all or a portion of the systems and techniques described herein (e.g., neural network 500 can be used to implement a perception module (or perception system) as discussed above). An input layer 520 can be configured to receive sensor data and/or data relating to an environment surrounding an AV. The neural network 500 includes multiple hidden layers 522 a, 522 b, through 522 n. The hidden layers 522 a, 522 b, through 522 n include "n" number of hidden layers, where "n" is an integer greater than or equal to one. The number of hidden layers can be made to include as many layers as needed for the given application. The neural network 500 further includes an output layer 521 that provides an output resulting from the processing performed by the hidden layers 522 a, 522 b, through 522 n. In one illustrative example, the output layer 521 can provide maximum tolerable processing times (e.g., for AV sensor data) based on current the current AV environment. In another example, the output layer 521 can identity one or more compute paths that may be used for processing AV sensor data based on the current AV environment and/or one or more preferred compute paths or disfavored compute paths that should be enabled/disabled based on the current AV environment.

The neural network 500 is a multi-layer neural network of interconnected nodes. Each node can represent a piece of information. Information associated with the nodes is shared among the different layers and each layer retains information as information is processed. In some cases, the neural network 500 can include a feed-forward network, in which case there are no feedback connections where outputs of the network are fed back into itself. In some cases, the neural network 500 can include a recurrent neural network, which can have loops that allow information to be carried across nodes while reading in input.

Information can be exchanged between nodes through node-to-node interconnections between the various layers. Nodes of the input layer 520 can activate a set of nodes in the first hidden layer 522a. For example, as shown, each of the input nodes of the input layer 520 is connected to each of the nodes of the first hidden layer 522a. The nodes of the first hidden layer 522a can transform the information of each input node by applying activation functions to the input node information. The information derived from the transformation can then be passed to and can activate the nodes of the next hidden layer 522b, which can perform their own designated functions. Example functions include convolutional, up-sampling, data transformation, and/or any other suitable functions. The output of the hidden layer 522b can then activate nodes of the next hidden layer, and so on. The output of the last hidden layer 522n can activate one or more nodes of the output layer 521, at which an output is provided. In some cases, while nodes in the neural network 500 are shown as having multiple output lines, a node can have a single output and all lines shown as being output from a node represent the same output value.

In some cases, each node or interconnection between nodes can have a weight that is a set of parameters derived from the training of the neural network 500. Once the neural network 500 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 500 to be adaptive to inputs and able to learn as more and more data is processed.

The neural network 500 is pre-trained to process the features from the data in the input layer 520 using the different hidden layers 522a, 522b, through 522n in order to provide the output through the output layer 521.

In some cases, the neural network 500 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 500 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total = \Sigma(\frac{1}{2}(target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 500 can perform a backward pass by determining which inputs (weights) most contributed to the loss of the network, and can adjust the weights so that the loss decreases and is eventually minimized.

The neural network 500 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 500 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 6:
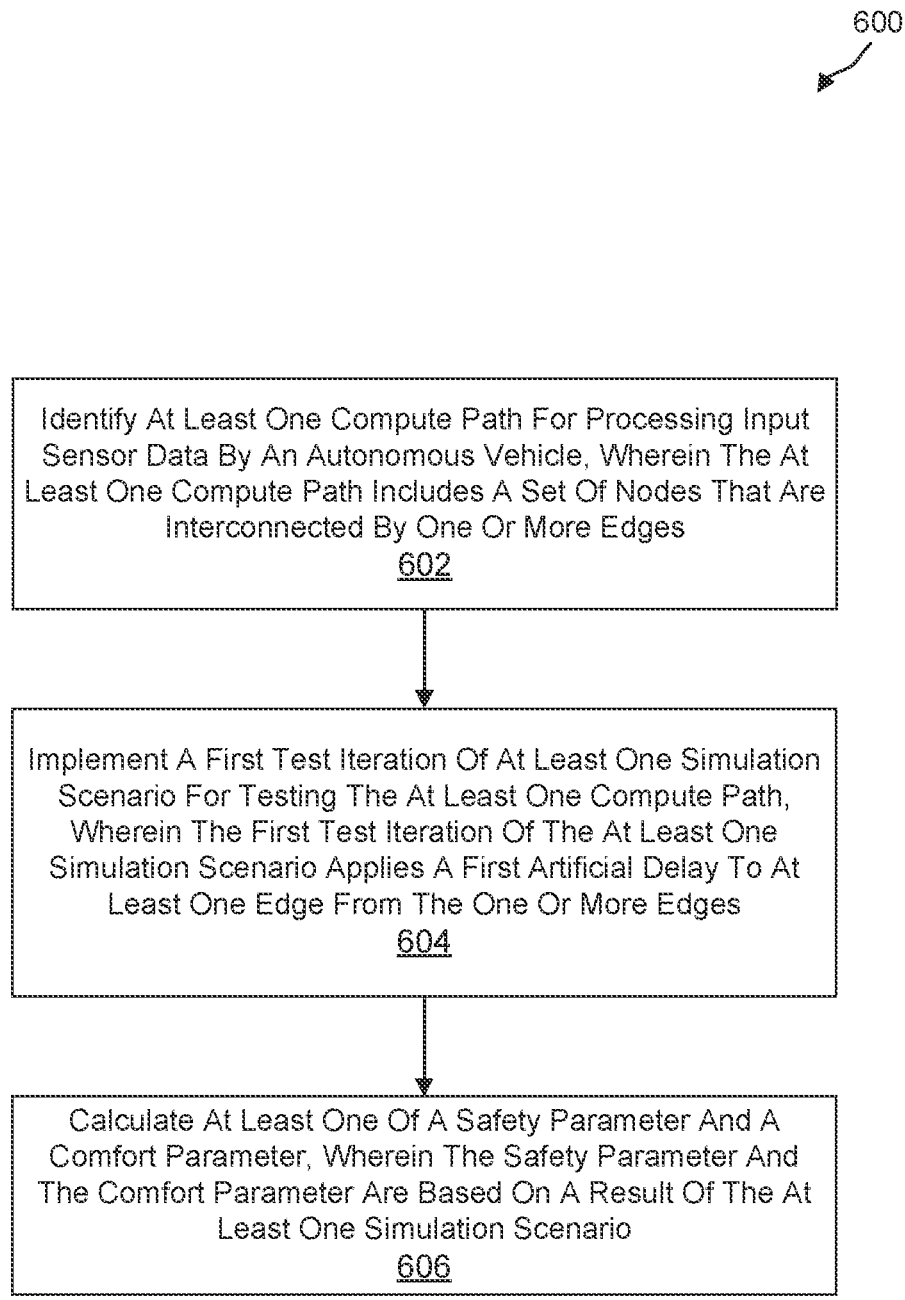
FIG. 6 is a flowchart illustrating another example process for testing and optimizing compute paths in an autonomous vehicle, in accordance with some examples of the present disclosure.

FIG. 6 illustrates an example of a process 600 for. At block 602, the process 600 includes identifying at least one compute path for processing input sensor data by an autonomous vehicle, wherein the at least one compute path includes a set of nodes that are interconnected by one or more edges. For example, the at least one compute path can include edge 306b (e.g., input data from AV sensors 302 to node 304a); edge 306h (e.g., data from node 304a to node 304c); edge 306l (data from node 304c to node 304d); and edge 306n (data from node 304d to node 304e). In some examples, the set of nodes can include at least one of a perception stack, a prediction stack, a planning stack, and a control stack.

At block 604, the process 600 includes implementing a first test iteration of at least one simulation scenario for testing the at least one compute path, wherein the first test iteration of the at least one simulation scenario applies a first artificial delay to at least one edge from the one or more edges. For example, the first test iteration of the at least one simulation scenario can introduce delay 310 at edge 306h.

At block 606, the process 600 includes calculating at least one of a safety parameter and a comfort parameter, wherein the safety parameter and the comfort parameter are based on a result of the at least one simulation scenario. In some cases, the safety parameter and/or the comfort parameter include the impact of compute delays. For example, the simulation scenario can be associated with safety passing criteria (e.g., threshold) corresponding to the performance of the AV. In one illustrative example, if the passing criteria may require the AV to maintain a minimum distance from other vehicles or objects. In another example, the comfort parameter may correspond to passenger comfort and may correspond to a stricter threshold than the safety parameter (e.g., passenger comfort may require that the AV keep a greater distance from other vehicles than the safety parameter).

In some aspects, the process 600 may include determining that the safety parameter or the comfort parameter is less than a threshold value, and in response, implementing a second test iteration of the at least one simulation scenario for testing that at least one compute path, wherein the second test iteration of the at least one simulation scenario applies a second artificial delay to the at least one edge from the one or more edges, wherein the second artificial delay is greater than the first artificial delay. For example, delay 310 and/or delay 312 can be increased upon determining that a test has passed (e.g., AV satisfied safety parameters and/or comfort parameters).

In some cases, the process 600 may include disabling one or more alternate compute paths for processing the input sensor data by the autonomous vehicle. For example, a test scenario may be configured to target specific compute paths and will disable alternative compute paths to ensure that the AV does not select a non-targeted compute path during the test.

In some examples, the process 600 may include identifying a plurality of compute paths for processing the input sensor data by the autonomous vehicle, wherein the at least one compute path is part of the plurality of compute paths and selectively enabling one or more compute paths from the plurality of compute paths during the first iteration of the at least one simulation scenario. For instance, one or more compute paths from network 300 can be selectively enabled and/or disabled while running different test simulations. In some cases, a test simulation may enable multiple compute paths to determine which one is used by the AV based on a simulation variable. For instance, the compute path used by the AV may change based on the proximity of an object (e.g., AV may circumvent one or more nodes to achieve faster processing speed).

In some instances, the process 600 may include identifying a preferred compute path from the plurality of compute paths for processing the input sensor data in a real-world environment corresponding to the at least one simulation scenario. For instance, the test simulation can be used to determine that a preferred compute path provides the highest margin with respect to a safety threshold and/or a comfort threshold when operating the AV in a real-world environment corresponding to the simulation environment.

In some aspects, the process 600 may include determining that the first artificial delay corresponds to a maximum tolerable delay based on the safety parameter or the comfort parameter. For example, delay 310 and/or delay 312 may correspond to the maximum tolerable delay when the test results are within an expected tolerance of a safety parameter and/or a passenger comfort parameter.

Figure 7:
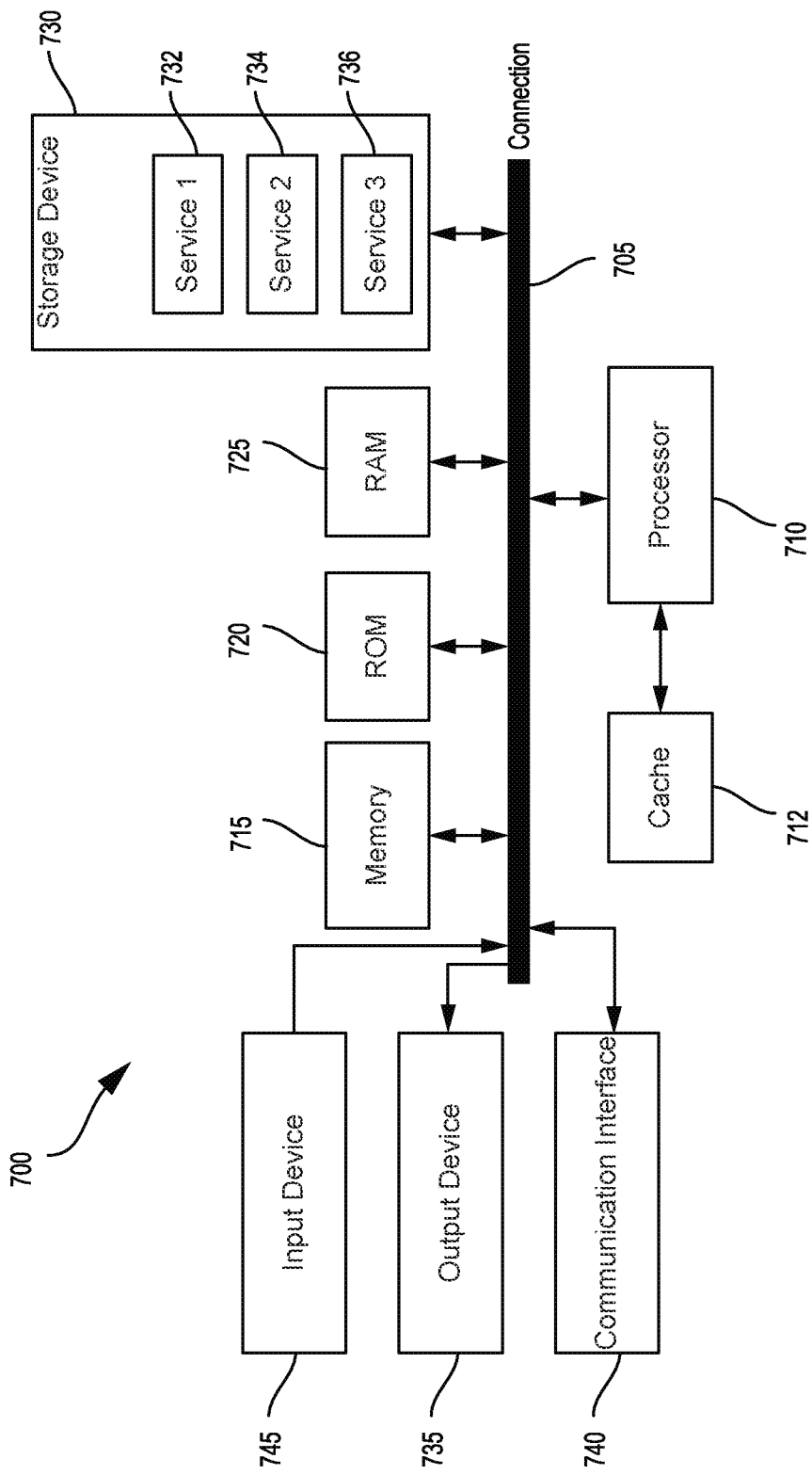
FIG. 7 is a diagram illustrating an example system architecture for implementing certain aspects described herein.

FIG. 7 illustrates an example processor-based system with which some aspects of the subject technology can be implemented. For example, processor-based system 700 can be any computing device making up internal computing system 110, a passenger device executing the ridesharing application 172, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some cases, one or more of the described system components represents many such components each performing some or all of the function for which the component is described. In some aspects, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, and/or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 can include an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission of wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, causes the system to perform a function. In some examples, a hardware service that performs a particular function can include the software component stored in a computer-readable medium in connection with the necessary hardware components, such as processor 710, connection 705, output device 735, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

Selected Examples

Illustrative examples of the disclosure include:

Aspect 1. A method comprising: identifying at least one compute path for processing input sensor data by an autonomous vehicle, wherein the at least one compute path includes a set of nodes that are interconnected by one or more edges; implementing a first test iteration of at least one simulation scenario for testing the at least one compute path, wherein the first test iteration of the at least one simulation scenario applies a first artificial delay to at least one edge from the one or more edges; and calculating at least one of a safety parameter and a comfort parameter, wherein the safety parameter and the comfort parameter are based on a result of the at least one simulation scenario.

Aspect 2. The method of Aspect 1, further comprising: determining that the safety parameter or the comfort parameter is less than a threshold value; and in response, implementing a second test iteration of the at least one simulation scenario for testing that at least one compute path, wherein the second test iteration of the at least one simulation scenario applies a second artificial delay to the at least one edge from the one or more edges, wherein the second artificial delay is greater than the first artificial delay Aspect 3. The method of any of Aspects 1 to 2, further comprising: disabling one or more alternate compute paths for processing the input sensor data by the autonomous vehicle.

Aspect 4. The method of any of Aspects 1 to 3, further comprising: identifying a plurality of compute paths for processing the input sensor data by the autonomous vehicle, wherein the at least one compute path is part of the plurality of compute paths; and selectively enabling one or more compute paths from the plurality of compute paths during the first iteration of the at least one simulation scenario.

Aspect 5. The method of Aspect 4, further comprising: identifying a preferred compute path from the plurality of compute paths for processing the input sensor data in a real-world environment corresponding to the at least one simulation scenario.

Aspect 6. The method of any of Aspects 1 to 5, further comprising: determining that the first artificial delay corresponds to a maximum tolerable delay based on the safety parameter or the comfort parameter.

Aspect 7. The method of any of Aspects 1 to 6, wherein the set of nodes includes at least one of a perception stack, a prediction stack, a planning stack, and a control stack.

Aspect 8. An apparatus comprising: at least one memory; and at least one processor coupled to the at least one memory, wherein the at least one processor is configured to perform operations in accordance with any one of Aspects 1 to 7.

Aspect 9. An apparatus comprising means for performing operations in accordance with any one of Aspects 1 to 7.

Aspect 10. A non-transitory computer-readable medium comprising instructions that, when executed by an apparatus, cause the apparatus to perform operations in accordance with any one of Aspects 1 to 7.

Aspect 11. A method comprising: determining, by an autonomous vehicle (AV), that a current AV environment corresponds to a simulated test scenario; selecting, based on the simulated test scenario, a compute path for processing sensor data corresponding to the current AV environment, wherein the compute path is associated with a maximum tolerable processing delay; and initiating a safe stop of the AV in response to determining that a processing delay of the compute path is greater than the maximum tolerable processing delay.

Aspect 12. An autonomous vehicle comprising: at least one memory; and at least one processor coupled to the at least one memory, wherein the at least one processor is configured to perform operations in accordance with Aspect 11.

Aspect 13. An apparatus comprising means for performing operations in accordance with Aspect 11.

Aspect 14. A non-transitory computer-readable medium comprising instructions that, when executed by an apparatus, cause the apparatus to perform operations in accordance with any Aspect 11.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   identifying at least one compute path for processing input sensor data by an autonomous vehicle, wherein the at least one compute path includes a set of nodes that are interconnected by one or more edges;
   implementing a first test iteration of at least one simulation scenario for testing the at least one compute path, wherein the first test iteration of the at least one simulation scenario applies a first artificial delay to at least one edge from the one or more edges by configuring an artificial software workload associated with the at least one edge to model a processing delay;
   determining a result of the first test iteration based on at least one of a safety parameter and a comfort parameter, wherein the safety parameter and the comfort parameter are based on a result of the at least one simulation scenario;
   determining, based on the result of the first test iteration, a maximum tolerable artificial delay for the at least one edge;
   configuring the autonomous vehicle for real-world operation based on the determined maximum tolerable artificial delay by setting a safe stop safety threshold used by the autonomous vehicle to initiate a safe stop maneuver during navigation; and
   initiating the safe stop maneuver based on the safe stop safety threshold.

2. The method of claim 1, further comprising:
   determining that the safety parameter or the comfort parameter is less than a threshold value; and
   in response, implementing a second test iteration of the at least one simulation scenario for testing that at least one compute path, wherein the second test iteration of the at least one simulation scenario applies a second artificial delay to the at least one edge from the one or more edges, wherein the second artificial delay is greater than the first artificial delay.

3. The method of claim 1, further comprising:
   disabling one or more alternate compute paths for processing the input sensor data by the autonomous vehicle.

4. The method of claim 1, further comprising:
   identifying a plurality of compute paths for processing the input sensor data by the autonomous vehicle, wherein the at least one compute path is part of the plurality of compute paths; and
   selectively enabling one or more compute paths from the plurality of compute paths during the first test iteration of the at least one simulation scenario.

5. The method of claim 4, further comprising:
   identifying a preferred compute path from the plurality of compute paths for processing the input sensor data in a real-world environment corresponding to the at least one simulation scenario.

6. The method of claim 1, wherein the set of nodes includes at least one of a perception stack, a prediction stack, a planning stack, and a control stack.

7. An apparatus comprising:
   at least one memory comprising instructions; and
   at least one processor configured to execute the instructions and cause the at least one processor to:
   identify at least one compute path for processing input sensor data by an autonomous vehicle, wherein the at least one compute path includes a set of nodes that are interconnected by one or more edges;
   implement a first test iteration of at least one simulation scenario for testing the at least one compute path, wherein the first test iteration of the at least one simulation scenario applies a first artificial delay to at least one edge from the one or more edges by configuring an artificial software workload associated with the at least one edge to model a processing delay;
   determine a result of the first test iteration based on at least one of a safety parameter and a comfort parameter, wherein the safety parameter and the comfort parameter are based on a result of the at least one simulation scenario;
   determine, based on the result of the first test iteration, a maximum tolerable artificial delay for the at least one edge;
   configure the autonomous vehicle for real-world operation based on the determined maximum tolerable artificial delay by setting a safe stop safety threshold used by the autonomous vehicle to initiate a safe stop maneuver during navigation; and
   initiate the safe stop maneuver based on the safe stop safety threshold.

8. The apparatus of claim 7, wherein the at least one processor is further configured to:
   determine that the safety parameter or the comfort parameter is less than a threshold value; and
   in response, implement a second test iteration of the at least one simulation scenario for testing that at least one compute path, wherein the second test iteration of the at least one simulation scenario applies a second artificial delay to the at least one edge from the one or more edges, wherein the second artificial delay is greater than the first artificial delay.

9. The apparatus of claim 7, wherein the at least one processor is further configured to:
   disable one or more alternate compute paths for processing the input sensor data by the autonomous vehicle.

10. The apparatus of claim 7, wherein the at least one processor is further configured to:
    identify a plurality of compute paths for processing the input sensor data by the autonomous vehicle, wherein the at least one compute path is part of the plurality of compute paths; and
    selectively enable one or more compute paths from the plurality of compute paths during the first test iteration of the at least one simulation scenario.

11. The apparatus of claim 10, wherein the at least one processor is further configured to:
    identify a preferred compute path from the plurality of compute paths for processing the input sensor data in a real-world environment corresponding to the at least one simulation scenario.

12. The apparatus of claim 7, wherein the set of nodes includes at least one of a perception stack, a prediction stack, a planning stack, and a control stack.

13. A non-transitory computer-readable storage medium having stored thereon instructions which, when executed by one or more processors, cause the one or more processors to:
    identify at least one compute path for processing input sensor data by an autonomous vehicle, wherein the at least one compute path includes a set of nodes that are interconnected by one or more edges;

implement a first test iteration of at least one simulation scenario for testing the at least one compute path, wherein the first test iteration of the at least one simulation scenario applies a first artificial delay to at least one edge from the one or more edges by configuring an artificial software workload associated with the at least one edge to model a processing delay;

determine a result of the first test iteration based on at least one of a safety parameter and a comfort parameter, wherein the safety parameter and the comfort parameter are based on a result of the at least one simulation scenario;

determine, based on the result of the first test iteration, a maximum tolerable artificial delay for the at least one edge;

configure the autonomous vehicle for real-world operation based on the determined maximum tolerable artificial delay by setting a safe stop safety threshold used by the autonomous vehicle to initiate a safe stop maneuver during navigation; and initiate the safe stop maneuver based on the safe stop safety threshold.

14. The non-transitory computer-readable storage medium of claim 13, comprising further instructions which, when executed by the one or more processors, cause the one or more processors to:

determine that the safety parameter or the comfort parameter is less than a threshold value; and in response, implement a second test iteration of the at least one simulation scenario for testing that at least one compute path, wherein the second test iteration of the at least one simulation scenario applies a second artificial delay to the at least one edge from the one or more edges, wherein the second artificial delay is greater than the first artificial delay.

15. The non-transitory computer-readable storage medium of claim 13, comprising further instructions which, when executed by the one or more processors, cause the one or more processors to:

disable one or more alternate compute paths for processing the input sensor data by the autonomous vehicle.

16. The non-transitory computer-readable storage medium of claim 13, comprising further instructions which, when executed by the one or more processors, cause the one or more processors to:

identify a plurality of compute paths for processing the input sensor data by the autonomous vehicle, wherein the at least one compute path is part of the plurality of compute paths; and selectively enable one or more compute paths from the plurality of compute paths during the first test iteration of the at least one simulation scenario.

17. The non-transitory computer-readable storage medium of claim 13, wherein the set of nodes includes at least one of a perception stack, a prediction stack, a planning stack, and a control stack.

* * * * *